(12) United States Patent
Escobedo (10) Patent No.: US 10,098,288 B1
(45) Date of Patent: Oct. 16, 2018

(54) PLANT POTS WITH STABILIZING STAKES AND RELATED METHODS

(71) Applicant: Frank Escobedo, Miami, FL (US)

(72) Inventor: Frank Escobedo, Miami, FL (US)

( * ) Notice: Subject to any disclaimer, the term of this patent is extended or adjusted under 35 U.S.C. 154(b) by 123 days.

(21) Appl. No.: 15/403,605

(22) Filed: Jan. 11, 2017

Related U.S. Application Data (63) Continuation-in-part of application No. 15/257,144, filed on Sep. 6, 2016, which is a continuation-in-part of application No. 15/182,976, filed on Jun. 15, 2016.

(51) Int. Cl.
*A01G 9/12* (2006.01)
*A01G 9/02* (2018.01)
*A47B 13/00* (2006.01)
*A47B 3/06* (2006.01)

(52) U.S. Cl.
CPC .............. *A01G 9/124* (2013.01); *A01G 9/02* (2013.01); *A47B 3/06* (2013.01); *A47B 13/003* (2013.01)

(58) Field of Classification Search
CPC ........... A01G 9/124; A01G 9/122; A01G 9/12
See application file for complete search history.

(56) References Cited

U.S. PATENT DOCUMENTS

| 4,151,680 | A | * | 5/1979 | Sena | A01G 9/022 47/39 |
|---|---|---|---|---|---|
| 4,841,670 | A | * | 6/1989 | Bitter | A01G 7/045 47/47 |
| 6,446,388 | B2 | * | 9/2002 | Masello | A01G 27/06 47/80 |
| 7,637,055 | B2 | * | 12/2009 | Donaldson | A01G 9/02 47/45 |
| 7,966,768 | B2 | * | 6/2011 | DiPaolo | A01G 9/124 47/39 |
| 8,857,103 | B1 | * | 10/2014 | Coon | A01G 9/124 47/45 |
| 9,943,041 | B2 | * | 4/2018 | Harger | H05K 999/99 |
| 2009/0056217 | A1 | * | 3/2009 | Dipaolo | A01G 9/12 47/70 |
| 2009/0133326 | A1 | * | 5/2009 | Donaldson | A01G 9/02 47/47 |
| 2017/0127621 | A1 | * | 5/2017 | Harger | A01G 9/124 |

* cited by examiner

*Primary Examiner* — Kristen C Hayes
(74) *Attorney, Agent, or Firm* — Allen Dyer Doppelt & Gilchrist (57) ABSTRACT

A plant pot assembly includes a plant pot defining an inner volume, having an upper pot edge, and including a mounting flange. A plurality of peripheral stakes attached to the mounting flange extend upwardly therefrom around the upper pot edge. The mounting flange defines a plurality of stake mounting holes, and each of the plurality of peripheral stakes includes a lower stake portion received in a respective one of the plurality of stake mounting holes. The plant pot assembly further includes a drainage system, at least one elevation blocks and at least one working table.

8 Claims, 10 Drawing Sheets

PLANT POTS WITH STABILIZING STAKES AND RELATED METHODS

CROSS-REFERENCE TO RELATED APPLICATION

This application is a continuation-in-part of U.S. patent application Ser. No. 15/257,144 filed on Sep. 6, 2016, which is a continuation-in-part of U.S. application Ser. No. 15/182,976 filed on Jun. 15, 2016, the contents of which applications are herein incorporated by reference in their entirety.

FIELD OF THE INVENTION

The present invention relates to plant pots, more particularly to pots having detachable supporting stakes, a drainage system and a feeding system.

BACKGROUND OF THE INVENTION

Problems associated with growing plants in conventional flower pots, e.g. vegetables, have been the lack of mechanical support above the pot and the lack of drainage and air circulation below the pot. The upper parts of plants, where the fruits, vegetables or flowers are normally found, must be nurtured and exposed to light for optimal growth. With no means to support the weight of a growing vine or branches, the upper part of a plant is easily bent, broken, or pulled downward by the force of gravity, potentially decreasing its exposure to light and limiting the nurturing of fruits, vegetables or flowers attached thereto. The lack of a means of drainage can promote the accumulation of excess water and prevent the roots of the plant from absorbing nutrients. Various plant pots have been developed for optimal plant growing, but further improvements are possible.

SUMMARY OF THE INVENTION

In view of the foregoing, an object of the present invention is to provide an improved plant pot with stabilizing stakes, a drainage system, and related features and methods. According to one embodiment of the invention, the plant pot assembly includes a plant pot defining an inner volume, having an upper pot edge and including a mounting flange. A plurality of peripheral stakes attached to the mounting flange extend upwardly therefrom around the upper pot edge. A drainage plate having a plurality of drainage holes is configured to be positioned above the bottom surface of the plant pot. The bottom pot surface and/or the drainage plate comprises a plurality of ridges for the drainage plate to rest thereon, thereby creating a drainage chamber. The plant pot assembly further comprises at least one ventilation channel extending between the upper edge and the drainage plate along at least one sidewall of the plant pot. The plant pot assembly can further include one or more elevation blocks configured to be placed underneath the bottom surface of the plant pot.

These and other objects, aspects and advantages of the present invention will be better appreciated in view of the drawings and following detailed description of preferred embodiments.

DETAILED DESCRIPTION OF A PREFERRED EMBODIMENT

Figure 1:
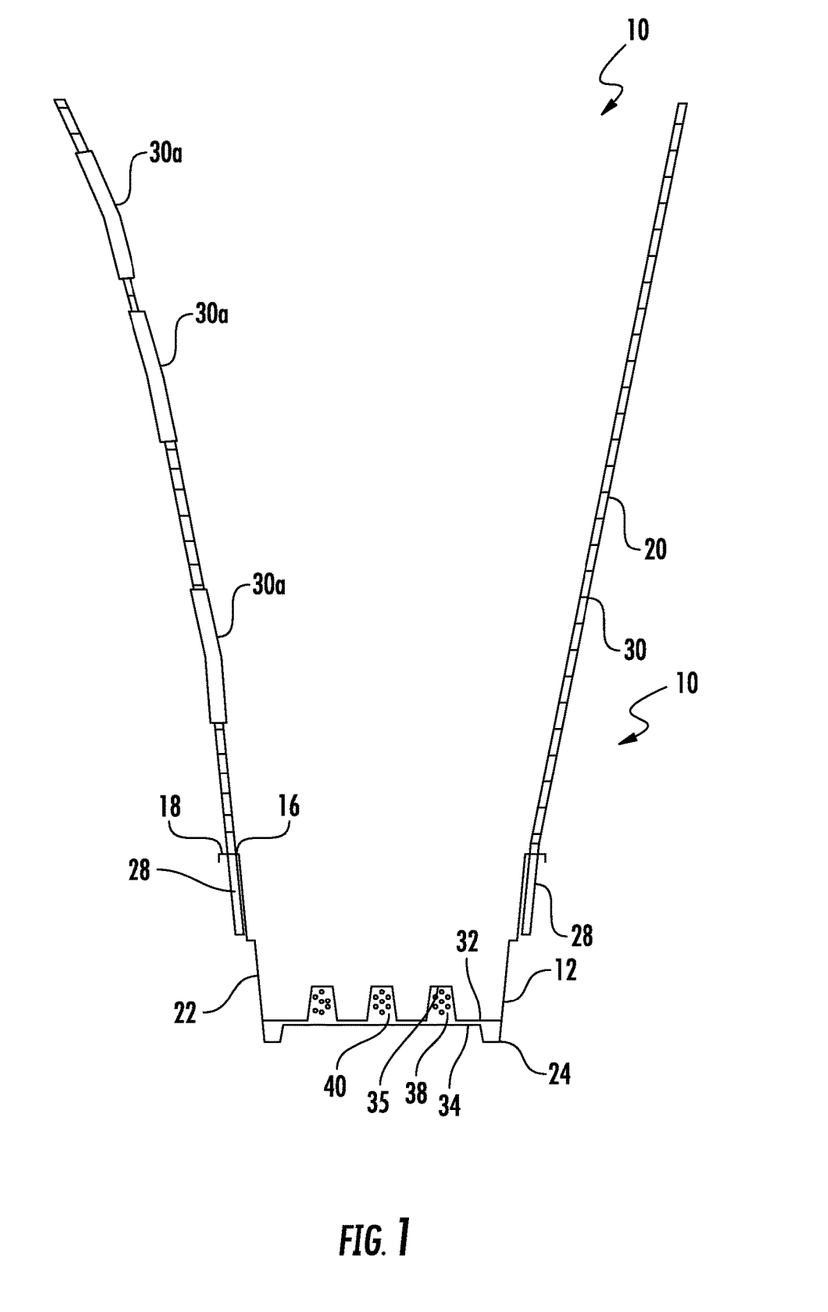
FIG. 1 is a front view of a plant pot assembly according to an embodiment of the present invention.

According to an embodiment of the present invention, and referring to FIG. 1, a plant pot assembly 10 includes a plant pot 12 defining an interior volume 14 having an upper pot edge 16 including a mounting flange 18. A plurality of peripheral stakes 20 are attached to and supported at the mounting flange 18, extending upwardly therefrom around the upper pot edge 16. Each of the plurality of peripheral stakes 20 includes a lower stake portion 28 and at least one upper stake portion 30.

Figure 4:
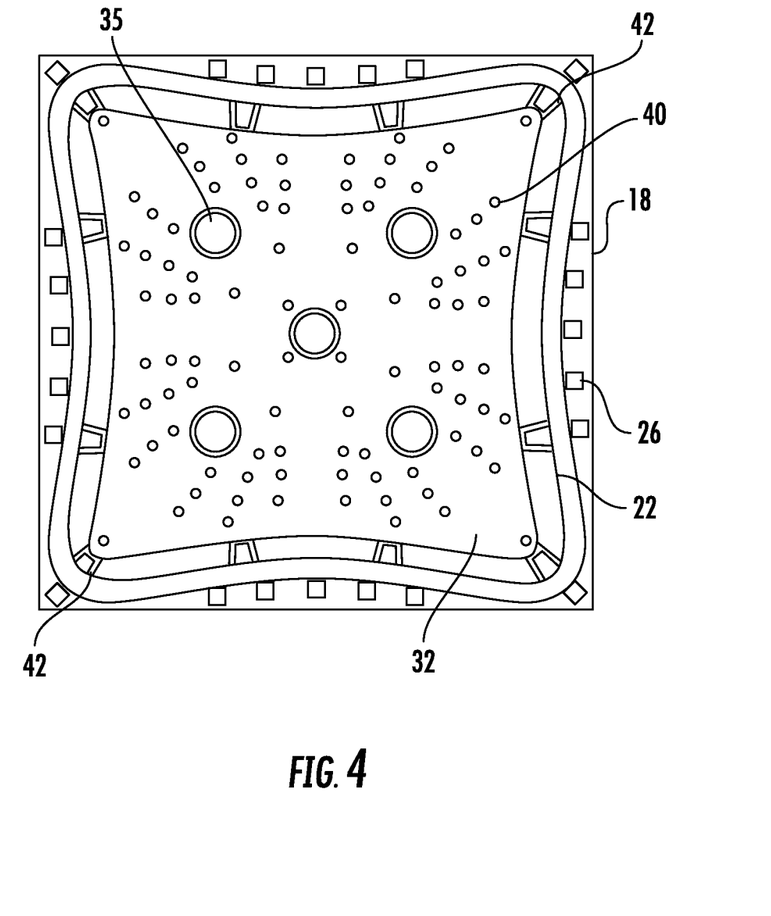
FIG. 4 is a top view of a drainage plate placed in the plant plot assembly of FIG. 2.

The plant pot 12 can be different shapes. For example, referring to FIGS. 4, 8A, 9A and 10A, the plant pot 12 can have a tapered square shape with radius corners between sidewalls 22. The radius corners function to reduce internal stress. In the depicted embodiment, the pot 12 has a square cross section with trapezoidal sidewalls 22. The upper edge 16 has a larger perimeter than the lower edge 24. The upper edge 16 can also have one or more concave curves to reduce the concentration of stress while providing sufficient space for the mounting flange 18, as shown in FIG. 4. The pot 12 can also have a polygonal cross section or some other desired shape of cross section. In the depicted embodiment, the sidewalls 22 are sloped approximately 5 degrees outboard from bottom to top so that the surface area of the pot 12 is maximized at the top, enabling multiple pots 12 to be stacked for storage and shipment. The plant pot 12 can adopt any desired dimension as needed. The plant pot 12 can be covered with embossed and printed patterns. The pot 12 can be made out of clay, ceramic, plastic, or any other suitable materials.

Figure 2:
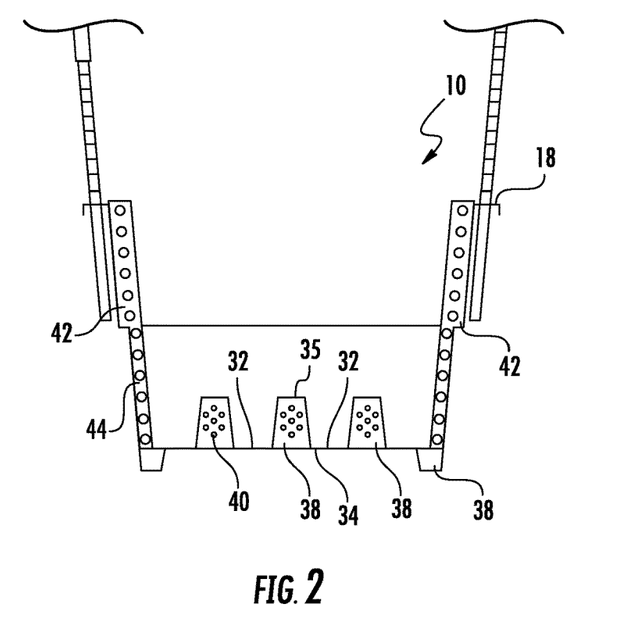
FIG. 2 is a front view of a plant pot assembly according to another embodiment of the present invention.
Figure 3:
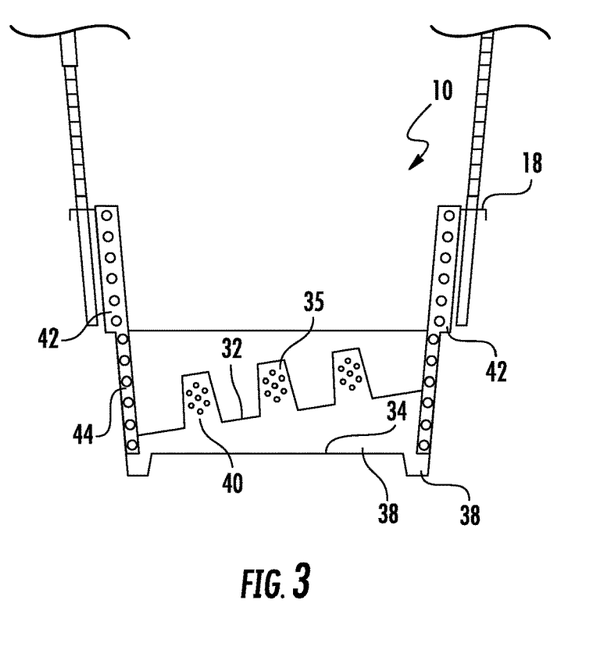
FIG. 3 is another front view of the plant pot assembly of FIG. 2.

Referring to FIGS. 1-3, a plurality of drainage and aerating cavities can be formed as desired on the bottom surface 34 of the pot 12. A plurality of legs 36 are also integrally formed on the bottom surface 34 to offset a certain length from the bottom surface 34. For example, four legs 36 are formed at the four corners of the bottom surface 34 of the square-shaped pot 12. The plurality of legs 36 can also include drainage cavities. The number of legs can be determined by the size, shape and/or weight of the pot 12. When multiple plant pots 12 are stacked, the upper edge 16 and the legs 36 of adjoining plant pots will stack in a regular array and hold the plant pots firmly in place. Alternatively, the legs 36 can be separated from the bottom surface 34 of the pot 12 and positioned under the bottom surface 34 when needed.

Figure 5:
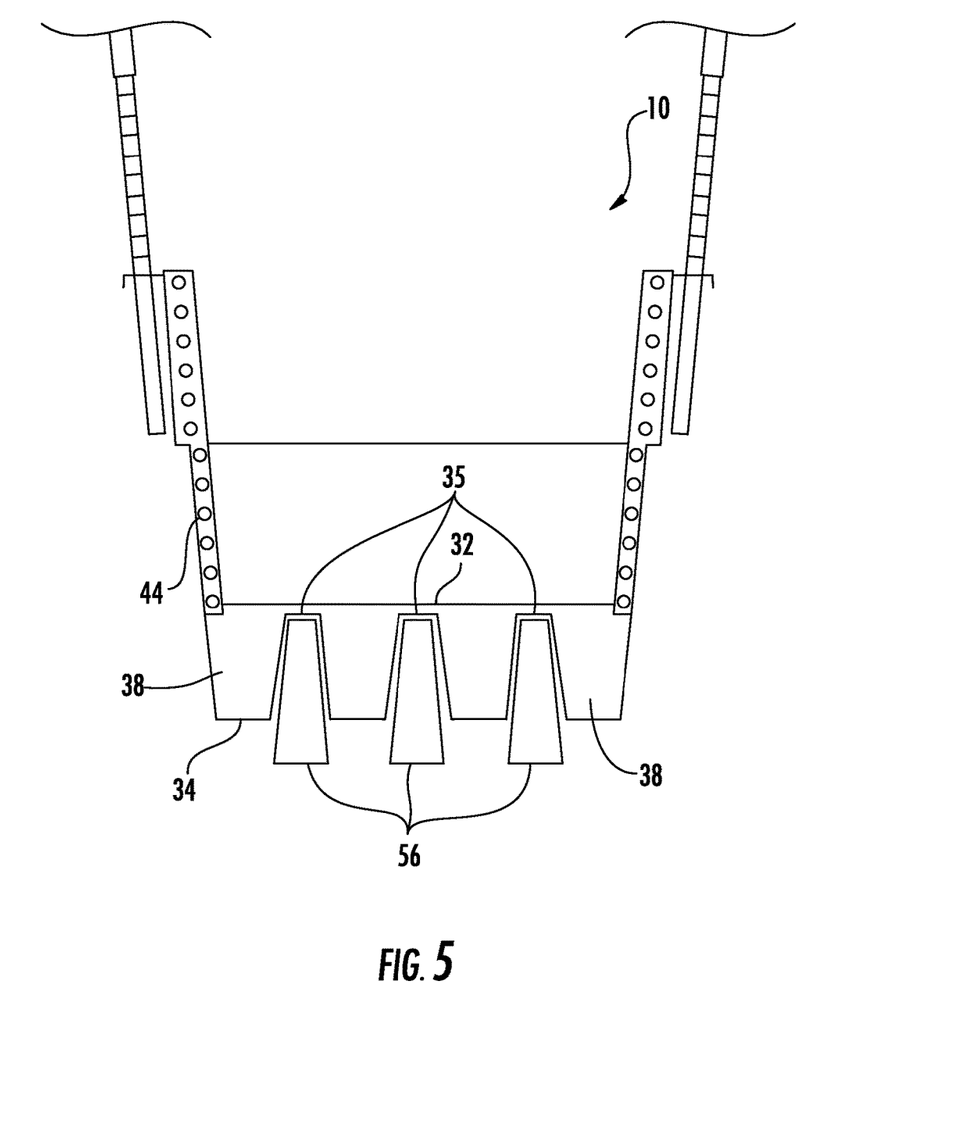
FIG. 5 is a front view of a plant pot assembly according to another embodiment of the invention.
Figure 6:
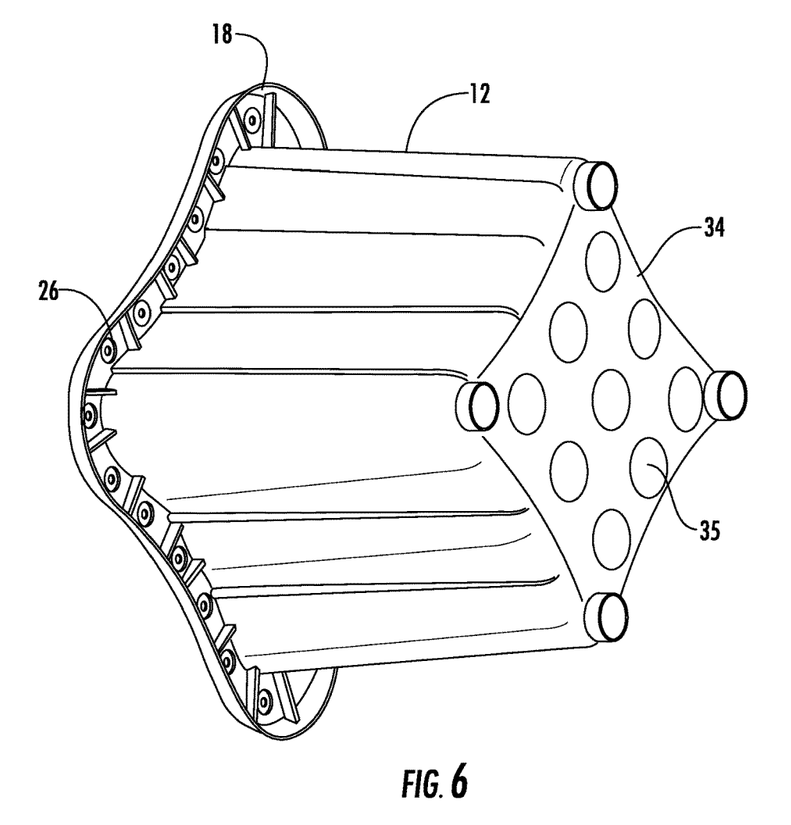
FIG. 6 is a bottom perspective view of the plant pot assembly of FIG. 5.

The plant pot assembly 10 also includes a drainage plate 32 adapted to be positioned above the top of bottom surface 34. The drainage plate 32 can include one or more ridges 35 rising up from the flat portion of the plate 32. A drainage chamber 38 can thus be created between the drainage plate 32 and the bottom surface 34. In another embodiment, one or more ridges 35 rise up from the bottom surface 34, as shown in FIGS. 5-6. The plate 32, which features a plurality of drainage holes, is held at a certain altitude above the bottom surface 34, thereby creating a drainage chamber 38 therebetween. The ridges 35 can be different shapes, dimensions and/or formed at different location of the drainage plate 32 (e.g., FIG. 4) or bottom surface 34, as shown in FIGS. 8A, 9A and 10A. Specifically, FIGS. 8A, 9A and 10A show the ridges 35 formed from the bottom surface 34. In the depicted embodiment, the ridges 35 are shown to be elevated about ⅞" above the bucket bottom surface 34, a drainage plate (not shown) with drain holes can rest upon the ridges 35, yielding a cavity space between drainage plate (not shown) and pot bottom surface 34. The ridges 35 can be of different sizes and shapes as needed to correspond to the shape and size of the pot 12.

Planter soil and a plant are positioned on the top of the drainage plate 32. A plurality of drainage holes and/or apertures 40 of appropriate size on flat portion and/or the sidewall of the ridges 35 can be formed on the plate 32 to drain excess liquid to the drainage chamber 38 while retaining most of the soil or growth medium for the plant. The bottom surface 34 can also include a plurality of drainage holes and/or apertures 40. The drainage plate 32 enables a plant to be aggressively fed with minimal risk of soil contamination and root rot. When a plant is transited from one pot to another or a new location, the plate 32 also can be moved along with the plant, allowing faster and less problematic plant transition and easy pot clean-up, as shown in FIG. 3. When a new plant is transferred to the pot 12, a new plate 32 can be used to prevent cross-contamination or soil exhaustion from a previous plant.

Referring to FIGS. 2 and 4, the plant pot assembly 10 also includes ventilation channels 42 along the sidewalls 22 to improve air circulation along the sidewalls 22 and more uniform soil moisture content and drainage of the fluids, as shown in FIG. 2. The ventilation channel 42 extends between the upper edge 16 and the drainage plate 32. The ventilation channel 42 is a channel with a plurality of ventilation holes 44 formed on the sidewall thereof. The ventilation channels 42 can be placed at the corners and/or along the sidewalls 22 as needed. The ventilation channels can follow the profile of the sidewall 22. In the depicted embodiment, a flat step is formed between a lower section and an upper section of the pot 12 to enable the ventilation channel 42 to be fixed securely to the sidewall 22. If soil should accumulate in the ventilation channels 42, a wand-type suction tube can be extended into the ventilation channels 42 to clear the soil. The ventilation channels 42 can be added and removed as needed, and the location of the ventilation channels 42 can be adjusted as desired.

Figure 7:
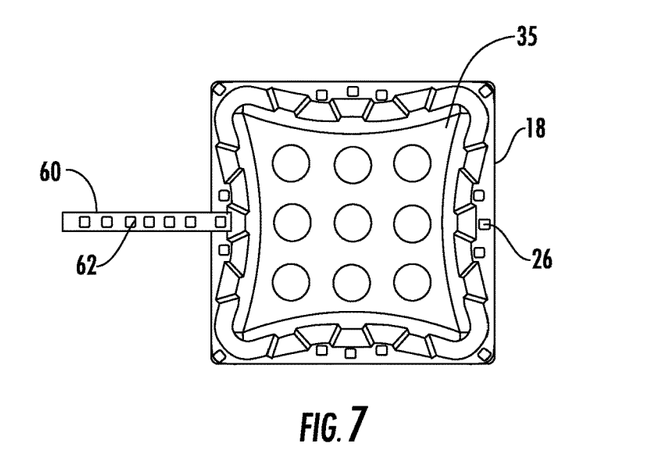
FIG. 7 is a top view of a plant pot assembly according to yet another embodiment of the present invention.

Referring to FIGS. 4, 6 and 7, the mounting flange 18 defines a plurality of stake mounting holes 26 and the lower portion 28 of each of the plurality of peripheral stakes 20 is received in a respective one of the plurality of stake mounting holes 26. In one embodiment, the cross section of the plurality of mounting holes 26 and of the lower stake portion 28 of the plurality of peripheral stakes 20 are square. The area of the square cross section of the lower stake portion 28 is slightly smaller than the area of the mounting holes 26 on the flange member 18, allowing the peripheral stakes 20 to be inserted therethrough and closely accommodated in the mounting holes 26. The square-shape design will ensure that the peripheral stakes 20 cannot rotate inside the mounting holes 26 but will instead largely be fixed in a specific orientation. In the depicted embodiment, the plurality of mounting holes 26 are square shaped with a side dimension of ⅝" and spaced 1" apart. However, other suitable shapes, dimensions and space arrangements for the mounting holes 26 can be used. The mounting flange 18 can be made of plastic or any other polymeric materials with required rigidity and strength.

The plurality of peripheral stakes 20 can be attached to the mounting flange 18 and detached at will. One or more peripheral stakes 20 can be added, removed or replaced as needed. The mounting direction of one or more of the plurality of peripheral stakes 20 can also be adjusted as desired.

Referring to FIG. 5, the plant pot assembly 10 can further include at least one elevation block 56 to elevate the pot 12. The at least one elevation block 56 can be positioned in recess area formed at the inverted ridges 35 from the bottom surface 34. The at least one elevation block 56 can be hollow inside to provide a fluid conduit capable of draining water or fluid from a plant pot. For example, the at least one elevation block 56 can be a PVC pipe. The at least one elevation block 56 can raise the altitude of a smaller plant plot to prevent it from being shaded by neighboring bigger plants or damaged from floor contamination, to facilitate the mass transfer of oxygen to the plants roots zone, and to minimize moisture damage to an underlying surface of the pot 12. The number of blocks used for a pot can be determined by the size and weight of the pot 12. A bigger and heavier pot will need more elevation blocks than smaller and lighter pot. The shape and size of the elevation blocks preferably matches a portion of the recess area formed by the ridge to accommodate a tight fitting. The at least one elevation block 56 is preferably made of a non-absorbent material such as plastic material. The elevation block 56 can be removed, displaced and/or disposed as needed.

Referring to FIG. 7, in one embodiment, at least one extension member 60 is attached to the mounting flange 18 of the plant pot 12. The at least one extension member 60 is preferably elongated as illustrated in FIG. 7. A plurality of holes 62 are formed on the extension member 60 to receive a plurality of peripheral stakes 20. The plurality of stakes 20 form a boundary to support a plant within the pot 12. In this scenario, the plurality of stakes 20 can be straight stakes or stakes described in connection with FIGS. 5 and 6. The at least one extension member 60 can be mounted to respective mounting holes 26 on the mounted flange 18 using a bolt or other suitable fasteners.

Figure 8:
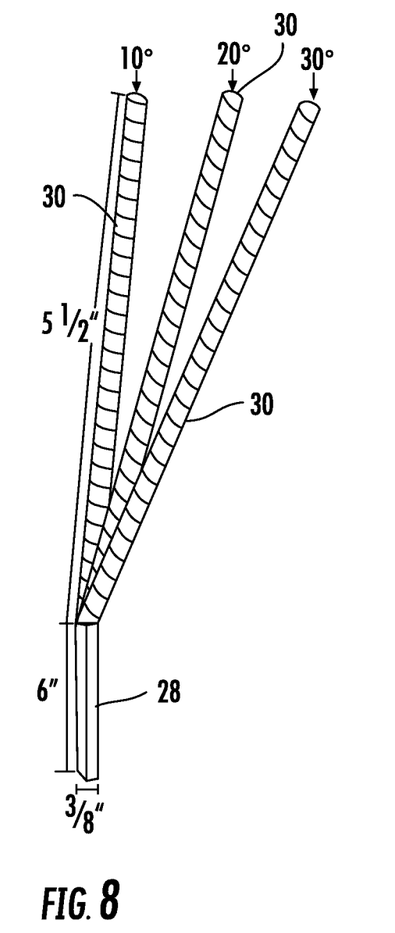
FIG. 8 is a perspective view of a peripheral stakes of a plant pot assembly, according to one embodiment of the present invention.
Figure 9:
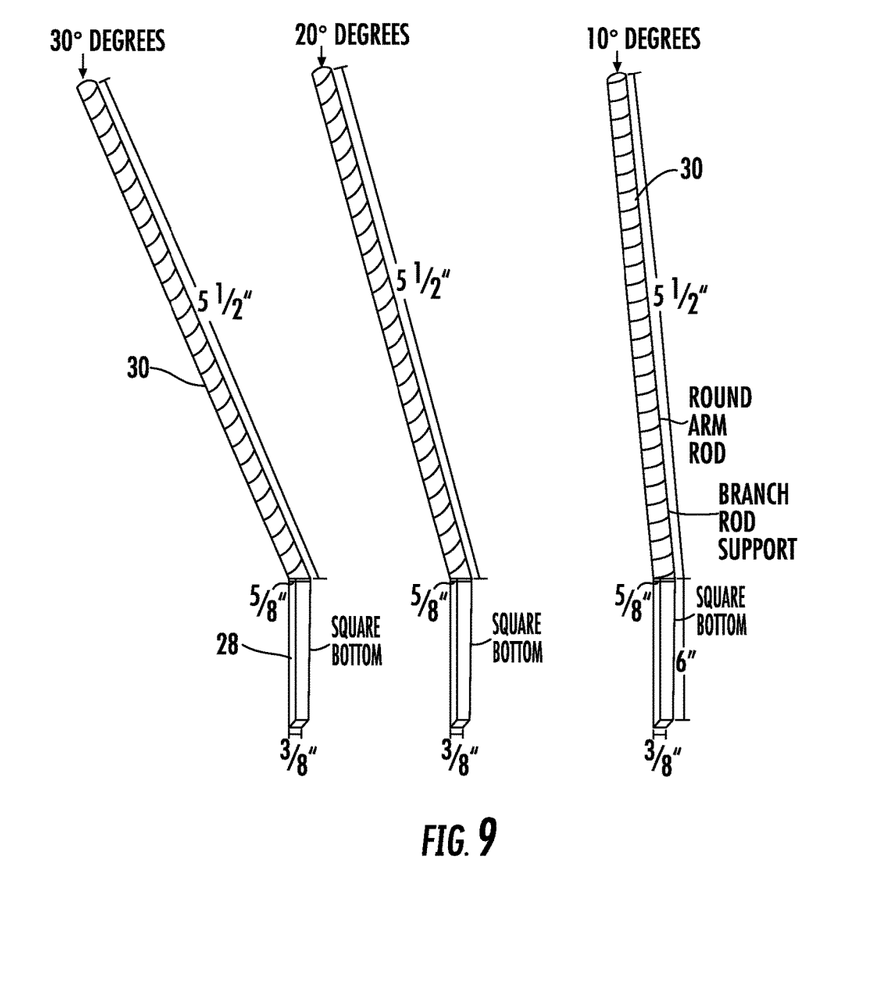
FIG. 9 is a perspective view of a plurality of peripheral stakes of a plant pot assembly, according to another embodiment of the present invention.
Figure 10A:
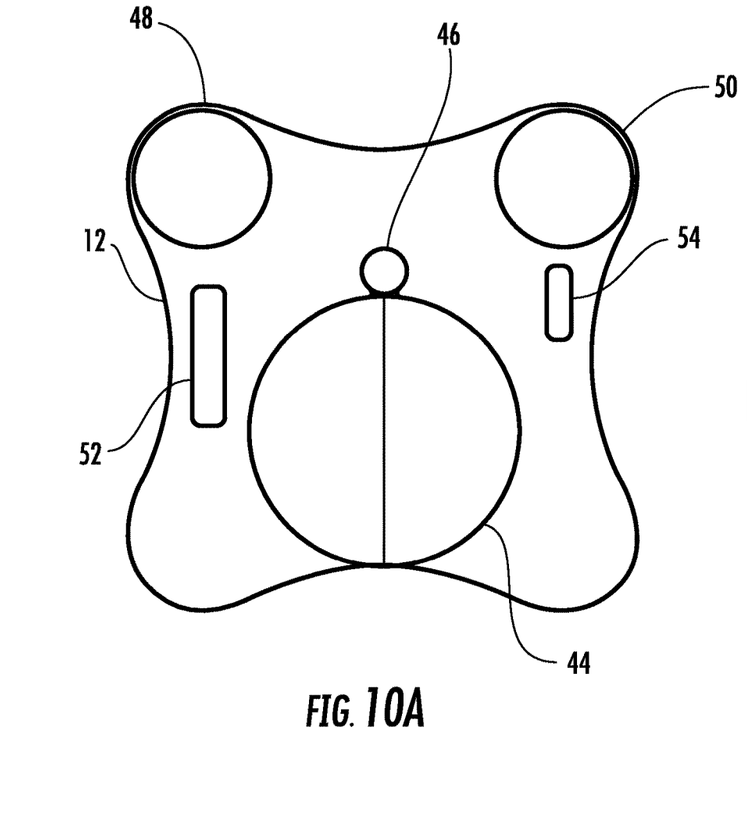
FIG. 10A is a top view of a plant pot assembly according to another embodiment of the present invention.

Referring to FIGS. 1-2 and 8-9, the plurality of stakes 20 are elongated rods. Each of the plurality of peripheral stakes 20 has at least one upper portion 30 on the opposite side of the lower portion 28. The lower portion 28 is vertical and the at least one upper portion 30 forms at least one specific angle with the lower portion 28. As shown in FIGS. 8-9, the angles between the lower portion 28 and the at least one upper portion 30 are 10 degrees, 20 degrees and 30 degrees, respectively. Other angles (e.g., 0 degree, 40 degrees, etc.) can also be used when desired. For example, peripheral stakes with larger angles (e.g., 40 degrees) may be used to support large and mature plant, and peripheral stakes with smaller angles (e.g., 10 degrees) may be used to support young and tender plants. When a peripheral stake 20 has more than one upper portion 30, as shown in FIG. 9, the multiple upper portions 30 with a 10-, 20- or 30-degree angle can be in the same plane or different planes. In the depicted embodiment, the upper portion 30 is 5'-0.5" in length and the lower portion 28 is ⅜" in width and 6" in length. However, other suitable dimensions of peripheral stakes 20 can be used. The peripheral stakes 20 can be made out of plastic, wood, metal, a combination thereof, or other materials with suitable strength and rigidity. Referring back to FIG. 1, the lower portion 28 is vertical and the upper portion 30 includes a plurality of gradually increased angle sections (e.g., 5 degrees, 10 degrees, 15 degrees, etc.). A plurality of connecting joints or wrapper tubes 30a can be placed on junctions of different angle sections to reinforce the joint of different angle sections. The wrapper tubes 30a are preferably made of plastic or other suitable materials.

The lower portion 28 of a peripheral stake 20 can have a different cross section shape than the upper portion 30 of the peripheral stake 20. For example, the lower portion 28 has a square cross section and the at least one upper portion 30 has a circular cross section, though other cross-sections or combination of cross section will be possible. The cross section of the mounting holds 26 on the mounting flange 18 will match the cross section of the lower portion 28.

In one embodiment, the lower portion 28 of each of the plurality of stakes 20 is marked with a specific color to indicate a specific angle formed between the upper portion 30 and the lower portion 28. For example, yellow corresponds to an upper portion 30 that forms a 30-degree angle with the low portion 28. Green corresponds to an upper portion that forms a 20-degree angle with the lower portion. Red corresponds to an upper portion that form a 10-degree angle with the lower portion.

Figure 10B:
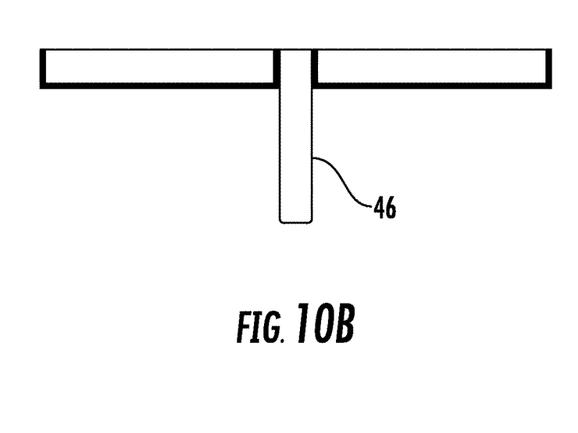
FIG. 10B is a side view of the plant pot assembly according to another embodiment of the present invention.

Referring to FIGS. 10A and 10B, the plant pot assembly 10 can further include at least one table attached to the mounting flange 18 and detached at will. The at least one table is connected to a supporting stake 46 which can be held in one of the mounting holes 26 on the mounting flange 18. Different type and size of working table can be attached, removed or replaced as needed. The mounting direction and height of one or more working table 20 can also be adjusted as desired. In the depicted embodiment, for example, three working tables are attached to the mounting flange 18. A larger circular working table 44 or a receptacle thereon can be configured for holding a cup, a drinking bottle, and the like for a gardener. A supporting stake 46 is attached to the working table 44 on its side or bottom surface and configured to be inserted into the mounting holes 26. Similarly, two smaller circular tables 48 and 50 designed to hold small cups and other small items (e.g., twist ties, labels, etc.) can also be attached to the mounting flange 18. Two smaller working tables 48 and 50 are provided so that the small items are organized readily available to users. The working tables preferably have a raised edge to ensure the items placed thereon and spill is largely retained in the working table rather than spilling over into a plant pot and/or a nearby worker or floor.

The plant pot assembly 10 can further include at least one slot on the mounting flange 18. In the depicted embodiment, for example, a larger slot 52 can be adapted to hold a larger pruning shear, and a smaller slot 54 can be adapted to hold a smaller trimming shear for trimming dead leaves or branches and/or snip stalk ties or other small tools suitable for the smaller slot 54.

Figure 11:
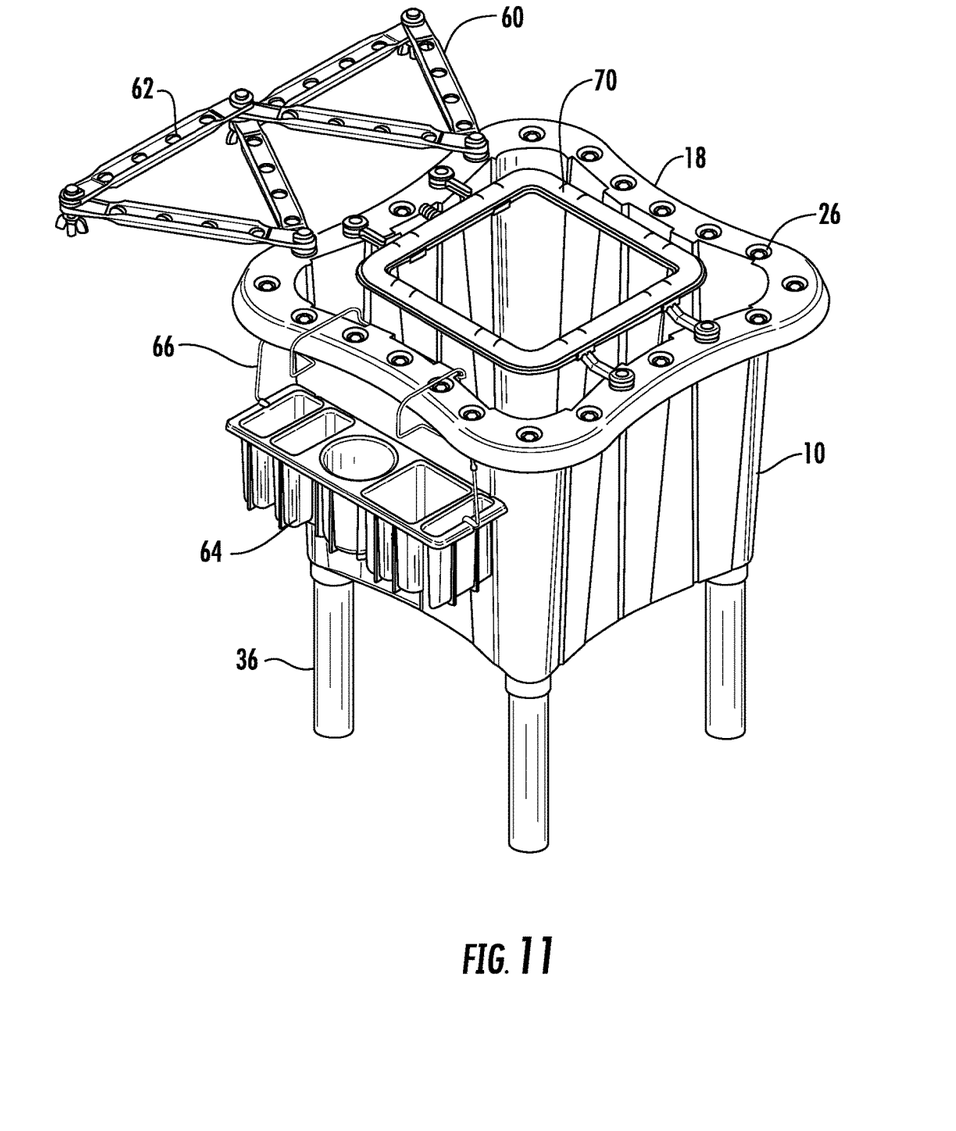
FIG. 11 is a perspective view of a plant pot assembly according to another embodiment of the present invention.

Referring to FIG. 11, the plant pot assembly 10 can further include at least one container 64 attached to the mounting flange 18 and detached at will. The at least one container 64 is secured to the mounting flange 18 via the supporting brace 66. Different number, shape and dimension of container 64 can be used. In the depicted embodiment, the at least one container 64 includes a plurality of receptacles for holding cups, tools, and the like for a gardener. The plant pot assembly 10 also includes a plurality of interconnected extension members 60. The plurality of extension member 60 can be interconnected and/or mounted to respective mounting holes 26 on the mounted flange 18 using bolts or other suitable fasteners. The interconnected extension members 60 can form different shapes as desired. A plurality of holes 62 on each extension member 60 can be configured to receive a plurality of peripheral stakes 20. The interconnected extension members 60 provide a more extended space to receive a plurality of stakes 20, forming a boundary to support a plant within the pot 12. A plurality of legs 36 are attached to the bottom surface 34 at four corners to lift the height of the pot 12. The plurality of legs 36 can also include drainage cavities. The legs 36 can be detached from the bottom surface 34 when needed. The plant pot assembly 10 further includes a feeding arm 70 to fit over the upper edge of the plant pot 12. In the depicted embodiment, the feeding arm 70 is rectangular shaped and mounted to the mounting hole 26 on the mounting flange 18. The feeding arm includes a plurality of spray nozzles (not shown) and connected to a supply hose (not shown).

Figure 12:
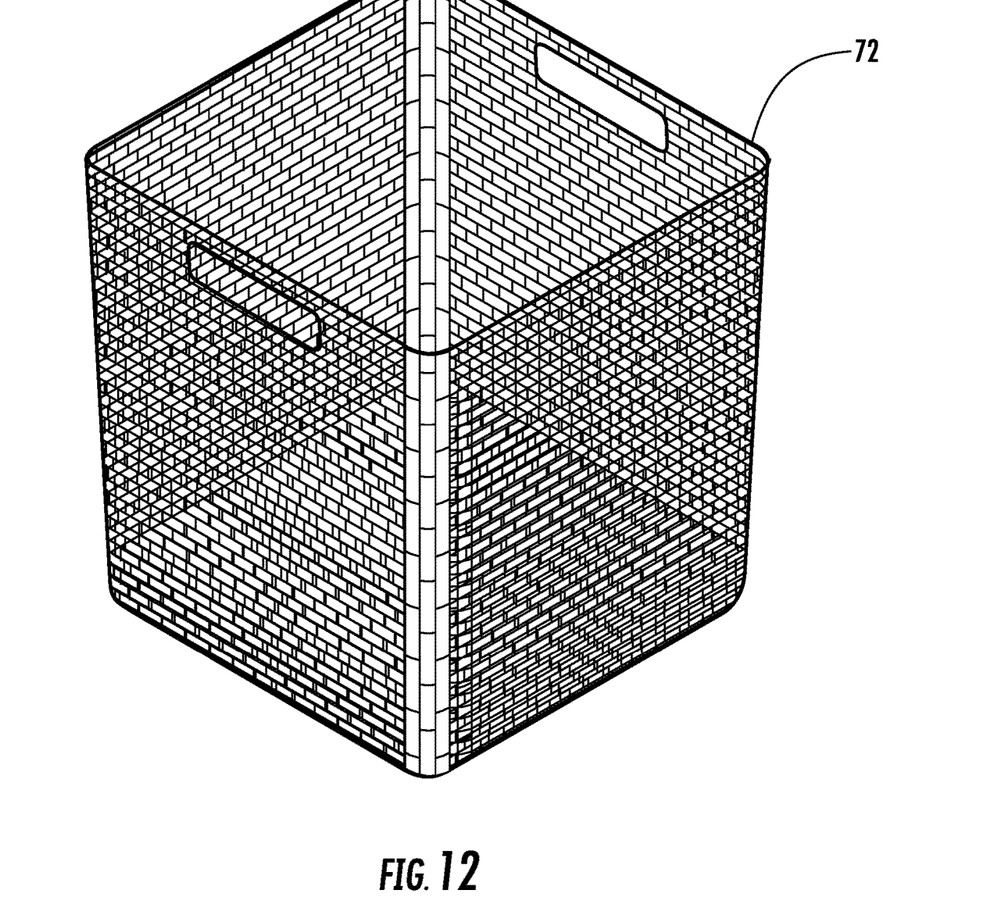
FIG. 12 is a perspective view of a layer of mesh screen that can be laid up against the inner sidewall of a plant pot, according to another embodiment of the present invention.

In one embodiment, a layer of mesh screen 72 shown in FIG. 12 can be laid up against the inner sidewall 22 of the pot 12 shown in FIG. 11. The mesh screen can exclude the ventilation channel areas. The layer of mesh screen 72 can create more air flow inside the pot 12. The layer of mesh screen 72 can be made of fiberglass, metal (e.g., aluminum screen, bronze) coated with a vinyl coating other types of non-corrosion cover, or other types of fibers such as Kevlar®, PBO, carbon, ultra-high molecular weight polyethylene (UHMWPE) can be used. The layer of mesh screen 72 can be treated with antibacterial or mold resistant solution. Different size of mesh size can be used for drainage or aeration purpose.

A method for stabilizing and maintain plants using a plant pot assembly 10 includes selecting a plurality of peripheral stakes 20 to be attached to a mounting flange 18 of the plant pot 12, based on, for example, size, shape, and/or species of a plant deposited in the pot. The selected plurality of peripheral stakes 20 are attached to/supported at the mounting flange 18 and extend upwardly therefrom around and above the upper pot edge 16. The directions of the plurality of stakes 20 can be adjusted to form a desired support boundary. A drainage plate 32 is placed on the bottom surface 34. A plant is disposed in a plant pot 12 and supported by the boundary formed by the peripheral stakes 20. Soil can be packed before or after a plurality of peripheral stakes 20 are attached to the plant pot 12. One or more branches of the plant can be tied to one or more of the plurality of peripheral stakes 20. A plurality of ventilation channels 42 can be placed along the sidewall of the pot 12. One or more elevation blocks 56 can be placed in the recess area created by ridges 35 formed from the bottom surface 34 of the pot 12. The plant can be elevated and therefore avoid shade from larger plant nearby and/or liquid accumulation of on the underlying surface the pot rest upon. Excess fluid will not accumulate inside the pot but drain through the drainage plate 32, the ventilation channel 42, and the one or more elevation blocks.

From the foregoing, it will be appreciated that a plant plot assembly according to the present invention supports plants in a pot with easily assembled parts so that the plants are held firmly in position in the pots. The assembly is readily adaptable to a wide range of plant sizes from a variety of purposes. The present invention also provides for a full circulation of air, water and nutrients in the pots so that the root system of the plants will have an optimum growth environment.

In general, the foregoing description is provided for exemplary and illustrative purposes; the present invention is not necessarily limited thereto. Rather, those skilled in the art will appreciate that additional modifications, as well as adaptations for particular circumstances, will fall within the scope of the invention as herein shown and described and of the claims appended hereto.

What is claimed is:

1. A plant pot assembly comprising:
   a plant pot defining an interior volume having an upper pot edge including a mounting flange;
   a plurality of peripheral stakes attached to the mounting flange and extending upwardly therefrom around the upper pot edge; and
   at least one elevation block adapted to be placed underneath a bottom surface of the plant pot; and
a screen mesh inserted against inner sidewalls of the plant pot.

2. A plant pot assembly comprising:
   a plant pot defining an interior volume having an upper pot edge including a mounting flange;
   a plurality of peripheral stakes attached to the mounting flange and extending upwardly therefrom around the upper pot edge; and
   at least one elevation block adapted to be placed underneath a bottom surface of the plant pot; and
at least one integrally formed or separate ventilation channel extends between the upper edge and a drainage plate along at least one sidewall of the plant pot.

3. A plant pot assembly comprising:
   a plant pot defining an interior volume having an upper pot edge including a mounting flange;
   a plurality of peripheral stakes attached to the mounting flange and extending upwardly therefrom around the upper pot edge; and
   at least one elevation block adapted to be placed underneath a bottom surface of the plant pot; and
at least one extension member mounted to the mounting flange, wherein a plurality of holes are formed on the at least one extension member to receive one or more of the plurality of peripheral stakes.

4. A plant pot assembly comprising:
   a plant pot defining an interior volume having an upper pot edge including a mounting flange;
   a plurality of peripheral stakes attached to the mounting flange and extending upwardly therefrom around the upper pot edge; and
   at least one elevation block adapted to be placed underneath a bottom surface of the plant pot; and
a plurality of interconnected extension members mounted to the mounting flange, wherein a plurality of holes are formed on the plurality of interconnected extension member to receive the plurality of peripheral stakes.

5. A plant pot assembly comprising:
   a plant pot defining an interior volume having an upper pot edge including a mounting flange;
   a plurality of peripheral stakes attached to the mounting flange and extending upwardly therefrom around the upper pot edge;
   a drainage plate configured to be positioned above a bottom surface of the plant pot;
   at least one table configured to be attached to the mounting flange; and
at least one ventilation channels extends between the upper edge and the plate along at least one sidewall of the plant pot;
   wherein at least one of the bottom surface and drainage plate comprises a plurality of ridges that create a drainage chamber between the drainage plate and the bottom surface.

6. A plant pot assembly comprising:
   a plant pot defining an interior volume having an upper pot edge including a mounting flange;
   a plurality of peripheral stakes attached to the mounting flange and extending upwardly therefrom around the upper pot edge;
   a drainage plate configured to be positioned above a bottom surface of the plant pot;
   at least one table configured to be attached to the mounting flange; and
   a screen mesh inserted against inner sidewalls of the plant pot;
wherein at least one of the bottom surface and drainage plate comprises a plurality of ridges that create a drainage chamber between the drainage plate and the bottom surface.

7. A plant pot assembly comprising:
   a plant pot defining an interior volume having an upper pot edge including a mounting flange;
   a plurality of peripheral stakes attached to the mounting flange and extending upwardly therefrom around the upper pot edge;
   a drainage plate configured to be positioned above a bottom surface of the plant pot;
   at least one table configured to be attached to the mounting flange; and
at least one extension member mounted to the mounting flange, wherein a plurality of holes are formed on the at least one extension member to receive one or more of the plurality of peripheral stakes;
wherein at least one of the bottom surface and drainage plate comprises a plurality of ridges that create a drainage chamber between the drainage plate and the bottom surface.

8. A plant pot assembly comprising:
   a plant pot defining an interior volume having an upper pot edge including a mounting flange;
   a plurality of peripheral stakes attached to the mounting flange and extending upwardly therefrom around the upper pot edge;
   a drainage plate configured to be positioned above a bottom surface of the plant pot;
   at least one table configured to be attached to the mounting flange; and
wherein at least one of the bottom surface and drainage plate comprises a plurality of ridges that create a drainage chamber between the drainage plate and the bottom surface; and
at least one feeding arm with a plurality of spraying nozzles on the at least one feeding arm configured to fit over the upper edge of the plant pot.

* * * * *